(12) United States Patent
Meschko (10) Patent No.: US 6,608,300 B2
(45) Date of Patent: Aug. 19, 2003

(54) MODULAR ENCODER ROTATION SENSING

(75) Inventor: John T. Meschko, Sandpoint, ID (US)

(73) Assignee: Encoder Products Co., Sandpoint, ID (US)

( * ) Notice: Subject to any disclaimer, the term of this patent is extended or adjusted under 35 U.S.C. 154(b) by 83 days.

(21) Appl. No.: 09/991,441

(22) Filed: Nov. 16, 2001

(65) Prior Publication Data

US 2003/0094568 A1 May 22, 2003

(51) Int. Cl.[7] ................................................ G01D 5/34
(52) U.S. Cl. .................................. 250/231.13; 250/239
(58) Field of Search ...................... 250/231.13, 231.14, 250/239; 341/11, 13; 180/6.4, 6.6, 78; 280/96, 846, 735

(56) References Cited

U.S. PATENT DOCUMENTS

| | | | |
|---|---|---|---|
| 5,708,496 A | 1/1998 | Barnett et al. | |
| 6,060,713 A | * 5/2000 | Skillicorn et al. | .......... 250/367 |
| 6,107,621 A | 8/2000 | Imai et al. | |
| 6,166,374 A | 12/2000 | Snyder | |

* cited by examiner

*Primary Examiner*—Que T. Le
(74) *Attorney, Agent, or Firm*—Wells St. John P.S.

(57) ABSTRACT

An encoder detects angular movement between a shaft and support about a rotational axis. A base mounts a signal emitter and sensor. A fitting is mountable to the shaft, coaxial with the rotational axis. A signal interrupting disk on the fitting is positioned in spaced relation to the emitter and sensor. An alignment bracket may be mounted to the base for relative axial movement. A yieldable member axially biases the base and alignment bracket to a pre-mounting relationship. A fastener secures at least one of the base or alignment bracket to the support, deflecting the yieldable member and positioning the emitter sensor, in a prescribed operative position on the support. The yieldable member will return the base and alignment bracket to the pre-mounting relationship when the encoder is removed from the support.

25 Claims, 9 Drawing Sheets

_Fig 9_

_Fig 10_

MODULAR ENCODER ROTATION SENSING

CROSS REFERENCE TO RELATED APPLICATION

This is an original U.S. utility patent application, and has no relation to previously filed U.S. or foreign patent applications, provisional applications, utility models, invention certificates, or registrations.

TECHNICAL FIELD

The present invention relates generally to the field of encoders and more particularly to rotation detecting encoders and mounting arrangements for modular rotation detecting encoders.

BACKGROUND OF THE INVENTION

Modular encoder designs may be applied to both optical or magnetic encoders. It is thus pointed out that in the instant application, the term "encoder" may encompass various encoder forms in which a signal is transmitted through or reflected from a movable screen or temporary blockage to a sensor. Movement of the screen between unblocked and blocked areas affects the signal reception and the data (relating to the intensity, duration, or both intensity and duration of the signal with respect to the blocked and unblocked areas). The received signals may be used for many purposes.

In general, optical and magnetic encoders make use of a stationary sensor and rotating drum or disc. The sensor must be aligned and positioned with respect to the drum or disk for proper encoder operation.

Optical encoders are more widely used; therefore the examples illustrated and generally discussed herein will be directed at optical encoders. However, as noted above, this application should not be considered to be limited strictly to optical encoders.

The fundamental components of a known form of optical modular encoder include a disc with areas of clear and opaque sections, mounted to a hollow disc support fitting for attachment to a rotating shaft. A sensor is also provided, along with, a light source such as an LED, a mounting plate, a gapping and aligning assembly and mounting screws. The sensor and light source usually face each other on opposite sides of the disc.

As the disk rotates, the sensor detects light that passes through the rotating clear disc sections and will not detect light through opaque, blocked sections. Alternating states, between the clear and opaque sections, trigger electrical output signals that may be used to determine shaft position, speed, and direction.

It is desirable to set and establish a precise radial alignment and axial air gap between the disc and sensor. It is also desirable to provide for simplified yet accurate installation of an encoder, that will assure such alignment and spacing for proper encoder operation.

BRIEF DESCRIPTION OF THE DRAWINGS

Preferred embodiments of the invention are described below with reference to the following accompanying drawings.

DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Before describing elements of preferred embodiments of the invention in detail, general aspects of the invention will first be disclosed.

In a first aspect generally represented by FIGS. 1–6, the encoder 10 is described for detecting relative angular movement between first and second relatively rotatable members 11, 12 respectively, about a rotational axis X. The encoder 10 in this aspect includes a base 14 with a signal generating emitter 20 mounted thereto and operable to generate a signal. A sensor 21 is also mounted to the base in spaced relation to the emitter. A fitting 24, defining an encoder axis Y is configured to be secured to the first member such as a motor drive or driven 11 with the encoder axis Y at least substantially coaxial with the rotational axis X of the first member 11. A signal interrupting disk 30 is mounted to the fitting 24 and is positioned in axially spaced relation to the emitter 20 and sensor 21. The base 14 also mounts an alignment bracket 32 for axial movement along the encoder axis Y. An axially yieldable member 38, disposed between the base 14 and alignment bracket, normally biases the base 14 and alignment bracket 32 axially through a prescribed distance toward engagement with a mechanical stop 44 that yieldably positions the base 14 and alignment bracket 32 in an inoperative pre-mounting relationship. At least one fastener 48 operably (directly or indirectly) engages the base 14 and alignment bracket 32 with the second member, such as a motor base 12, and is operable (a) in a first mode to deflect the yieldable member 38 axially and to position the base 14 and alignment bracket 32 in an operative position with the emitter 20 and sensor 21 in a prescribed axial relation to the disk 30, and (b) in a second mode in which the yieldable member 38 is free to return the base and alignment bracket 14, 32 to the inoperative pre-mounting relationship.

In another aspect also generally exemplified by embodiments shown in FIGS. 1–6, encoder module 10 is provided for detecting rotational movement of a first member comprising a shaft 11 about an axis X with respect to a shaft support 12. The encoder 10 also includes an emitter 20 and a sensor 21 which are mounted to a base 14 in axial spaced relation. A fitting 24 is configured to be mounted in fixed axial position to the shaft 11 for rotation therewith. A signal interrupting disk 30 is mounted to the fitting 24 and is disposed axially between the emitter 20 and sensor 21. An alignment bracket 32 is mounted for axial movement relative to the base 14. A yieldable member 38 is disposed between the alignment bracket 32 and base 14, normally biasing the base 14 axially, with respect to the alignment bracket 32, through a prescribed distance toward a stop 44, defining an inoperative, pre-mounting relationship. A fastener 48 is coupled directly or indirectly with the alignment bracket and base, and is configured to be secured to the shaft support (second member 12), to selectively move the base and alignment bracket 14, 32 relative to one another and in opposition to the yieldable member 38, to axially separate at least one of the alignment bracket 32 and base 14 from the fitting 24 by at least a part of said prescribed distance.

Figure 4:
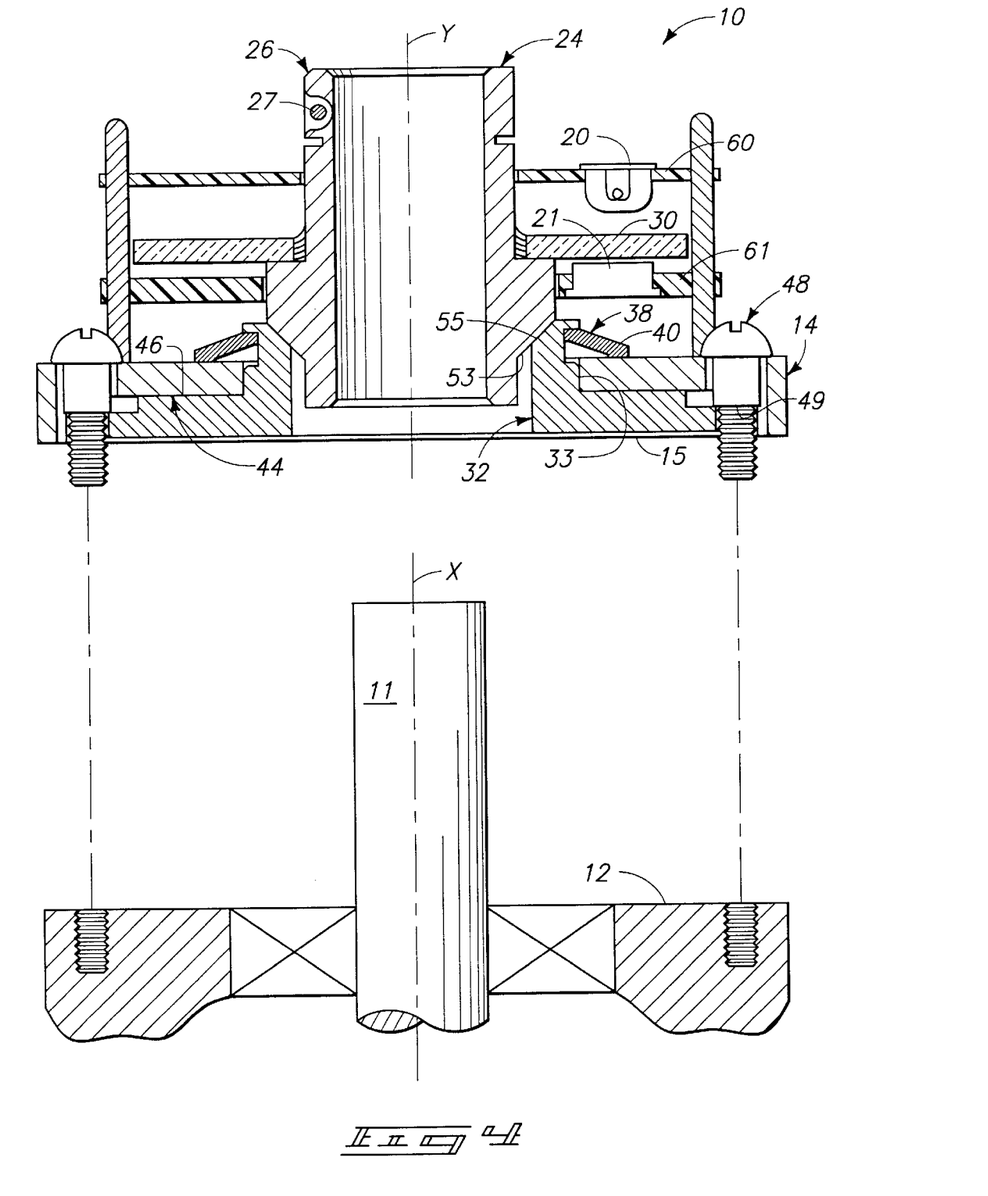
FIG. 4 is a view of an alternate of the preferred modular encoder in position adjacent to the same or similar first and second members.
Figure 5:
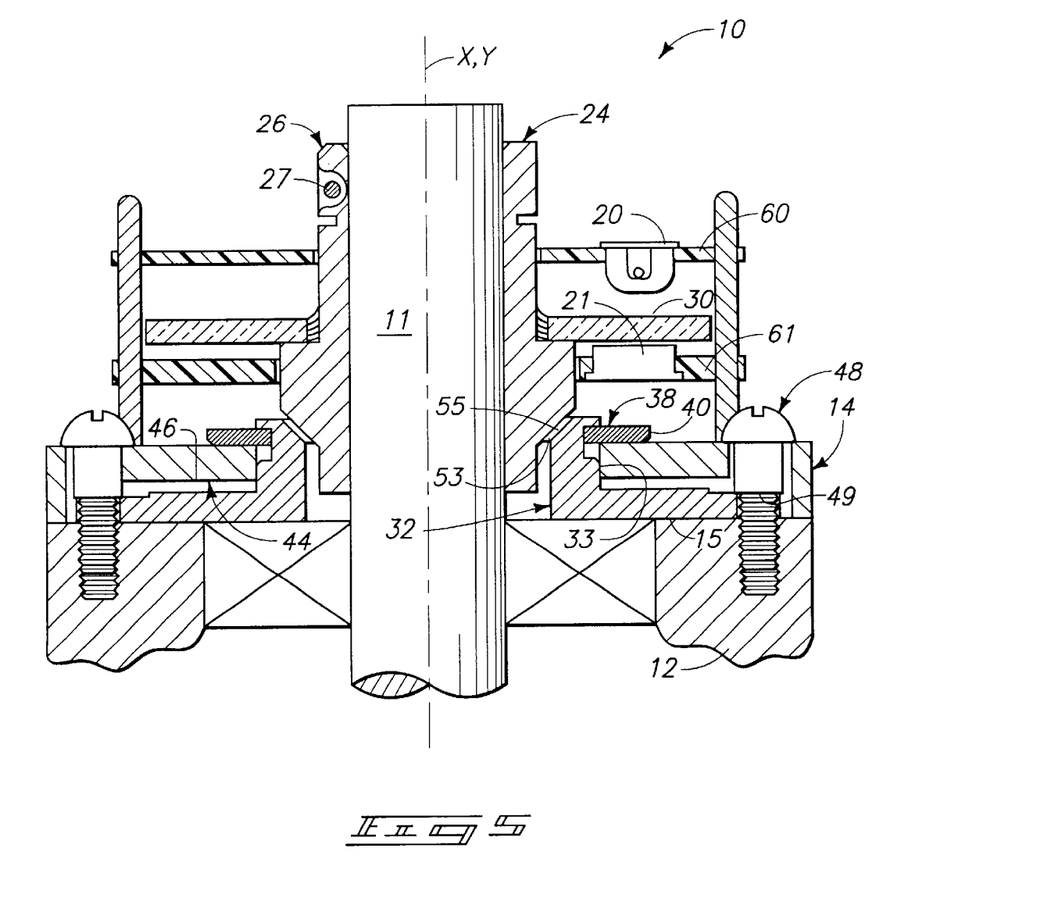
FIG. 5 is a view similar to FIG. 3 only showing the modular encoder in a secured position with respect to the first and second members.
Figure 6:
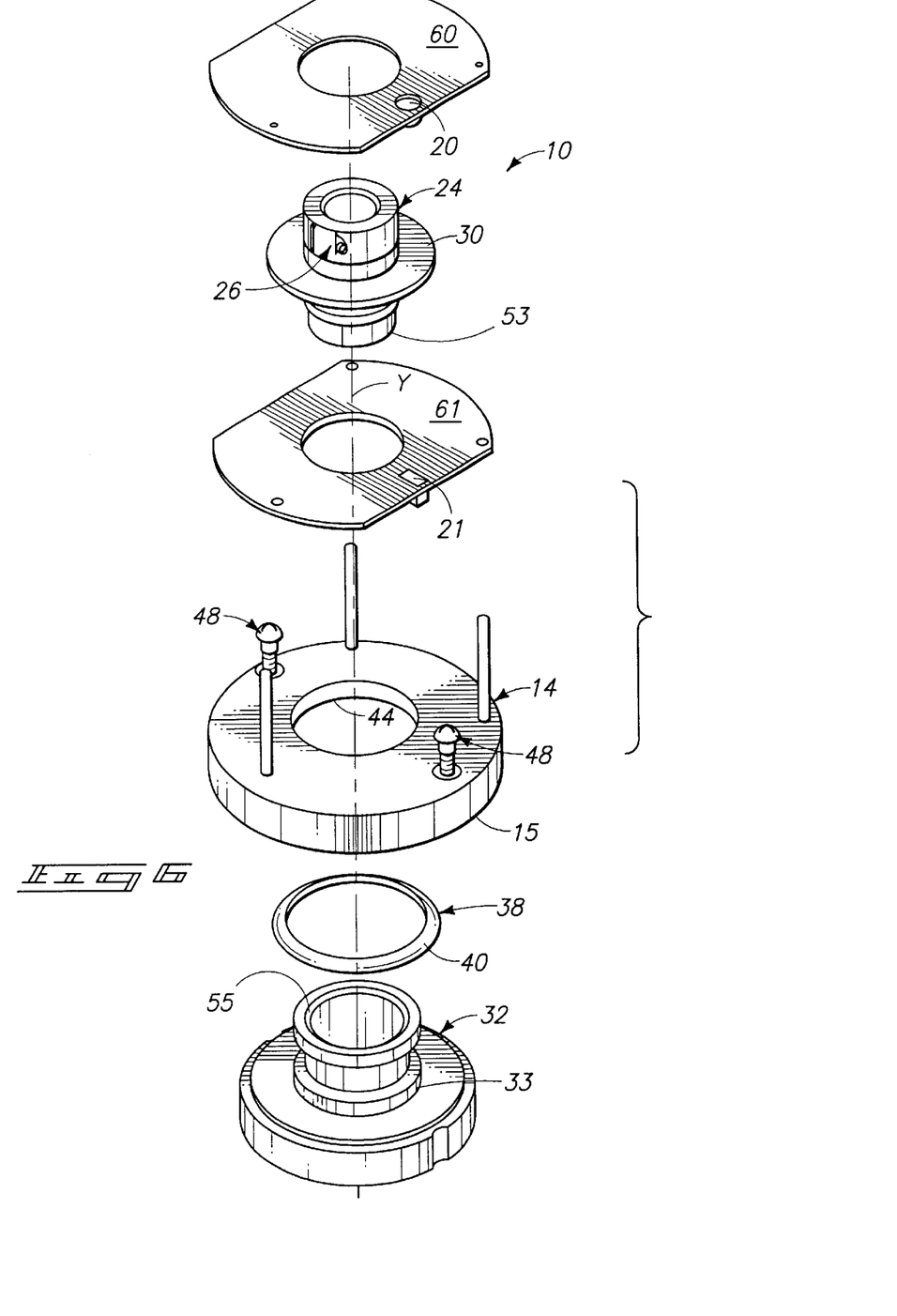
FIG. 6 is a perspective exploded schematic view of the encoder embodiment shown in FIGS. 4 and 5.

In a further aspect as generally exemplified by FIGS. 4–6, an encoder module 10 is provided for detecting rotational motion of a shaft 11 about a rotation axis X relative to a support 12 in which a base 14 of the encoder includes a support engagement surface 15. An emitter 20 and a sensor 21 are mounted in fixed relation on the base 14. A fitting 24 is configured to be mounted in fixed axial position to the shaft 11 for rotation therewith. A signal interrupting disk 30 is mounted to the fitting 24 and is disposed axially with respect to the emitter and sensor 20, 21. An alignment bracket 32 is mounted to the base 14 for axial movement thereon. A yieldable member 38 is disposed between the alignment bracket 32 and base 14, normally biasing the base 14 and alignment bracket 32 toward one another. Centering surfaces 53, 55 respectively on the fitting 24 and alignment bracket 32, radially position the signal interrupting disk 30 with respect to emitter 20 and sensor 21. At least one fastener 48 is configured to be secured to the shaft support and to hold the support engagement surface 15 against the support 12 and selectively move the alignment bracket 32 axially away from the fitting 24 to axially separate the bracket 32 and fitting 24.

Figure 7:
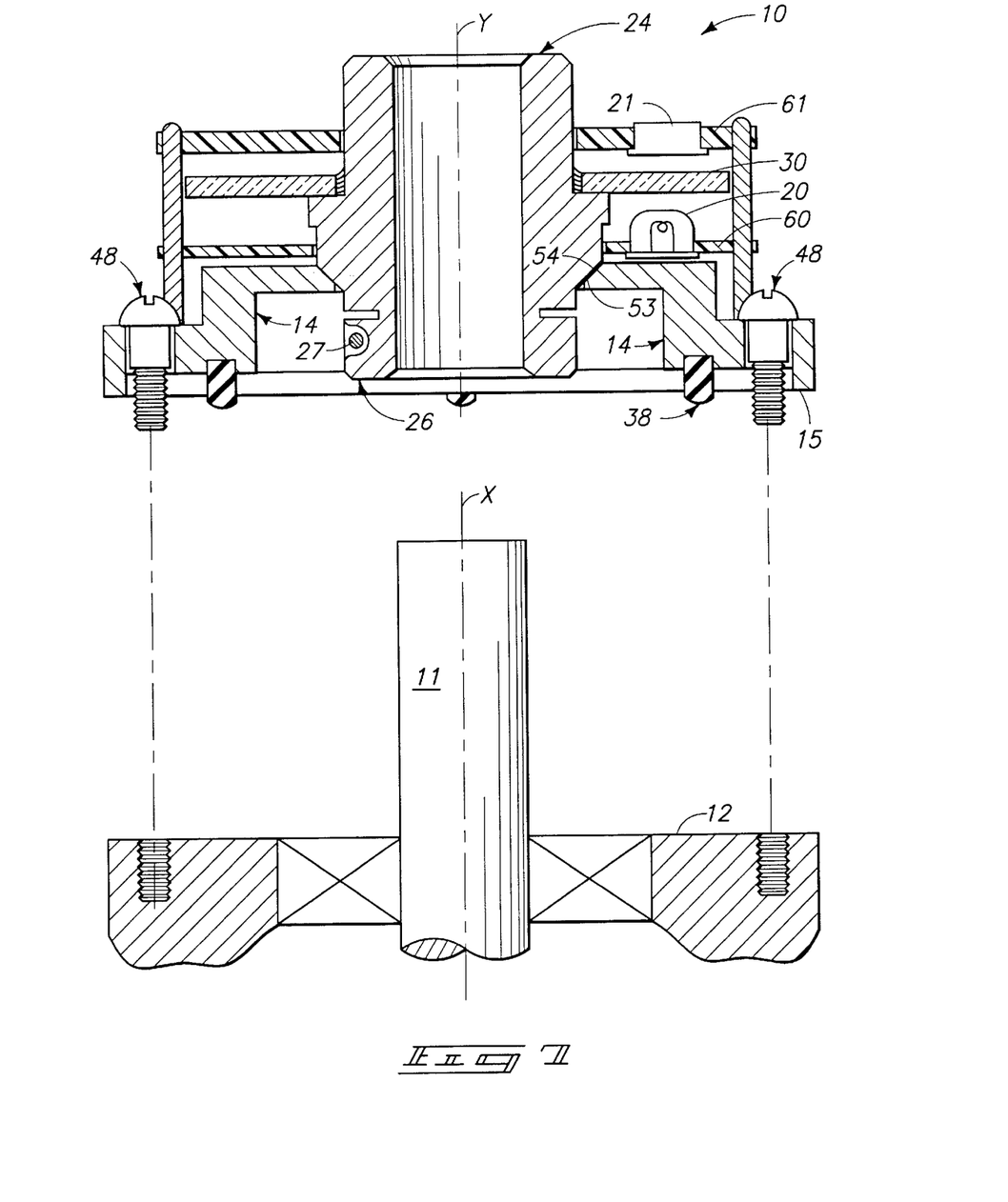
FIG. 7 is a diagrammatic view of another variation of the preferred encoder in which an alignment bracket is not included.
Figure 8:
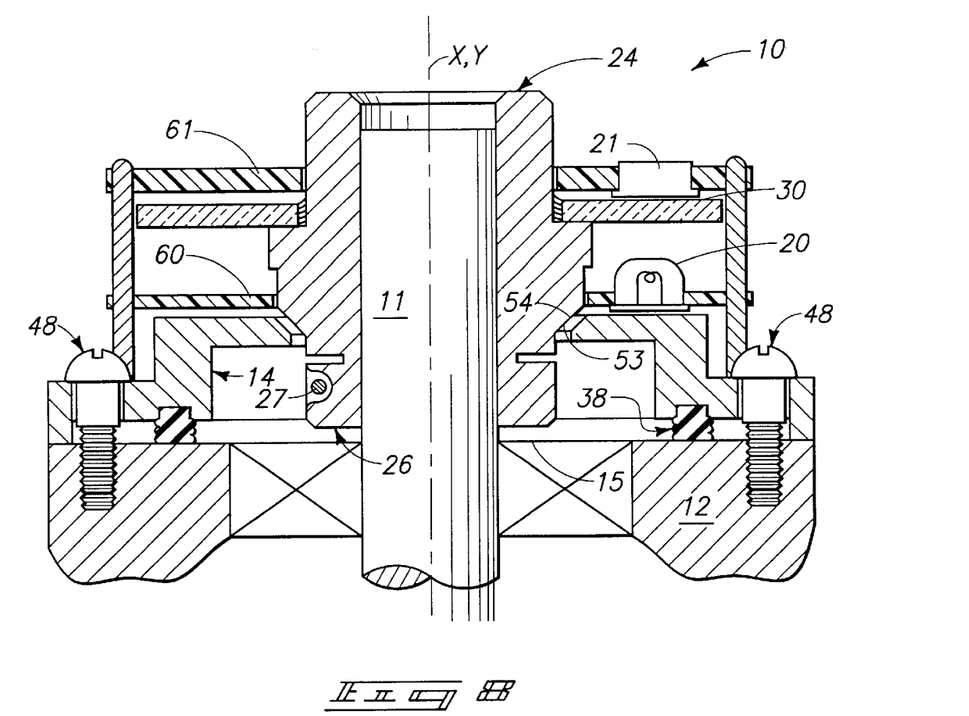
FIG. 8 is a diagrammatic view of the variation shown in FIG. 7 mounted to a first and second member.

Another aspect provides an encoder module 10 as generally exemplified by FIGS. 7, 8 for detecting rotational motion of a shaft 11 about a rotation axis X relative to a support 12, in which a base 14 of the encoder provides a support engagement surface 15. An emitter 20 and a sensor 21 are mounted in fixed relation on the base 14. A fitting 24 is configured to be mounted in fixed axial position to the shaft 11 for rotation therewith, and mounts a signal interrupting disk 30, which is disposed axially with respect to the emitter 20 and sensor 21. At least one of the base 14 or fitting 24 includes a centering surface 53 and/or 54 for centering the base 14 on the fitting 24. A yieldable member 38 is positioned on the base to engage and deflect against the support through a prescribed axial distance. At least one fastener 48 is operably (directly or indirectly) engaged with the base 14 and is configured to be secured to the shaft support 12 to move the base 14 axially against resistance from the yieldable member 38 through at least a portion of said prescribed distance and thereby: (a) disengage the centering surfaces 53, 54; (b) move the emitter 20 and sensor 21 into a selected axial relation to the disk 30, and (c) bring the support engagement surface 15 into contact with the support 12.

The above general aspects of the invention will now be described in greater detail in terms of preferred examples of elements and combinations thereof. It should be understood that the drawings are exemplary of preferred forms and that other forms may be envisioned from the teachings of this disclosure.

DETAILED DESCRIPTION

Preferred forms of the present encoder 10 provide position, direction, and velocity sensing for a device such as a motor in which one member such as shaft 11 rotates about an axis X with respect to another member such as a motor body 12. Installation of the present encoder 10 to a device with a rotating shaft 11 is simplified by making radial concentric alignment and axial air gapping of the encoder an automatic and transparent operation for the installer.

Alignment within one preferred form of the encoder 10 is maintained using a sliding boss 33, which is received by an encoder base. A space between the base 14 and bracket 32 is occupied by the yieldable member 38 which initially sets the bracket 32 and base 14 apart. During installation the fastener 48 in the form of mounting screws overcome the spring force, thereby allowing the shaft and disc to rotate freely in a proper operating orientation, with the disk spaced a prescribed operational distance from the encoder emitter 20 and sensor 21.

It is pointed out that the electronic components of the present encoder may be of conventional form, utilizing conventional optical components including the emitter 20 and sensor 21 in radial spaced orientation to a single interrupting disk 30. In the example illustrated, the sensor 21 and the emitter 20 are situated on opposed axial sides of the disk 30. The disk may thus be provided with alternating blocked and unblocked areas that will affect transmission of signals through the disk material. Alternatively, it is conceivable and within the scope of my invention that the sensor and emitter both be situated on one side of the disk. In such a situation, signals from the emitter would be influenced by reflection from the disk as it rotates. Reflected signals would then be received by the sensor 21. In either instance, it is desirable to provide precise positioning of the disk in axial relation to the emitter and sensor, and especially with respect to the axial gap between the disk and sensor. Thus, it should be understood that the present encoder 10 may be provided to function effectively with various forms of emitter and sensor configurations, along with conventional disk compositions and configurations known in the encoder and encoder design fields. Details of particular emitters and sensors thus need not be discussed in detail herein as such elements are well known to those in the art of encoder design and production.

Several components of the preferred forms of the invention are common to one another. Such common components may include the emitter 20 and sensor 21, along with the disk 30 and components associated therewith. Further, the fitting 24 may be substantially similar in various embodiments, it being typical that the fitting be provided with a central bore defining the encoder axis Y. The fitting mounts the disk 30 for rotation therewith. The disk 30 may be secured by mechanical means, adhesive, or other appropriate media to the fitting in such a manner that one will not rotate with respect to the other. It is most preferable that the disk rotate in a plane that is perpendicular to the axis Y.

It is typical also that the fitting 24 be provided with a clamp 26 that may be selectively operated to secure the fitting 24 in a selected axial position along the length of the first rotatable member or shaft 11. The clamp may be in the form of a conventional collar arrangement that may be selectively tightened concentrically about the motor shaft by provision of one or more threaded clamp screws 27. It is preferred that the clamp 26 be of releasable form to facilitate removal of the encoder from the shaft 11. In fact it is possible for other equivalent forms of clamp arrangements to be provided. For example, a set screw (not shown) of conventional form, could be installed into the fitting for securing the fitting axially along the shaft 11.

The fitting 24 may be substantially similar for the illustrated embodiments of the invention, except that the form illustrated in FIGS. 4 through 6 include the clamp portion 26 at an upper end of the fitting. This arrangement is provided for the illustrated configuration in order to facilitate access to the clamp screw 27.

It is also typical that the base 14 support at least one plate or circuit board that is provided with a fitting receiving aperture received over the fitting 24. In the illustrated examples, two such apertured plates or circuit boards 60, 61 are provided, one mounting the emitter 20, and the other mounting the sensor 21. It is preferred that the plates 60, 61 be held axially stationary with respect to the base 14.

Reference will now be made in particular to the embodiment illustrated in FIGS. 1–3. Here, the encoder 10 is provided with a base 14 and an alignment bracket 32 that interfit for relative axial movement. It is preferable that the two elements (base 14 and alignment bracket 32) be provided in a nested configuration in which the base 14 fits in a nesting relationship with the boss 33 formed on the alignment bracket 32. The boss 33 is preferably substantially circular and is received within a similarly shaped indentation or cylindrical bore formed within the base to facilitate the nesting and coaxial slidable relationship.

The interfitting base 14 and alignment bracket 32 are preferably centered with respect to the fitting 24 and axis Y by provision of centering surfaces 53, 54. Centering surface 53 is provided in preferred forms, as a frusto-conical surface on the fitting 24 centered on axis Y. The centering surface 54 may be provided as a complimentary frusto-conical surface formed on the base 14.

It is pointed out, however, that either one of the frusto-conical surfaces 53, 54 may accomplish the centering function. In other words, only one of the surfaces 53, 54 could be of frusto-conical shape, and the mating surface need only be shaped for engagement and centering by the singular frusto-conical surface. It is preferred, however, that both surfaces 53, 54 be provided and that they center on the encoder axis Y. The surfaces 53, 54 will separate from one another when the encoder is properly mounted to the motor or other appropriate device, leaving the disk 30, the emitter 20 and sensor 21 all radially or concentrically positioned with respect to the axes X and Y.

An alternative approach to accomplish the centering function is to make use of a circular pilot and boss of a nature similar to the boss 33 discussed above. The circular pilot on one of the base or alignment bracket could receive the circular boss on the fitting or hub to center or radially position the one relative to the other. The axial depth of engagement between the pilot and boss, however, should be such that the centering surfaces will become disengaged axially when the encoder is properly mounted.

Figure 1:
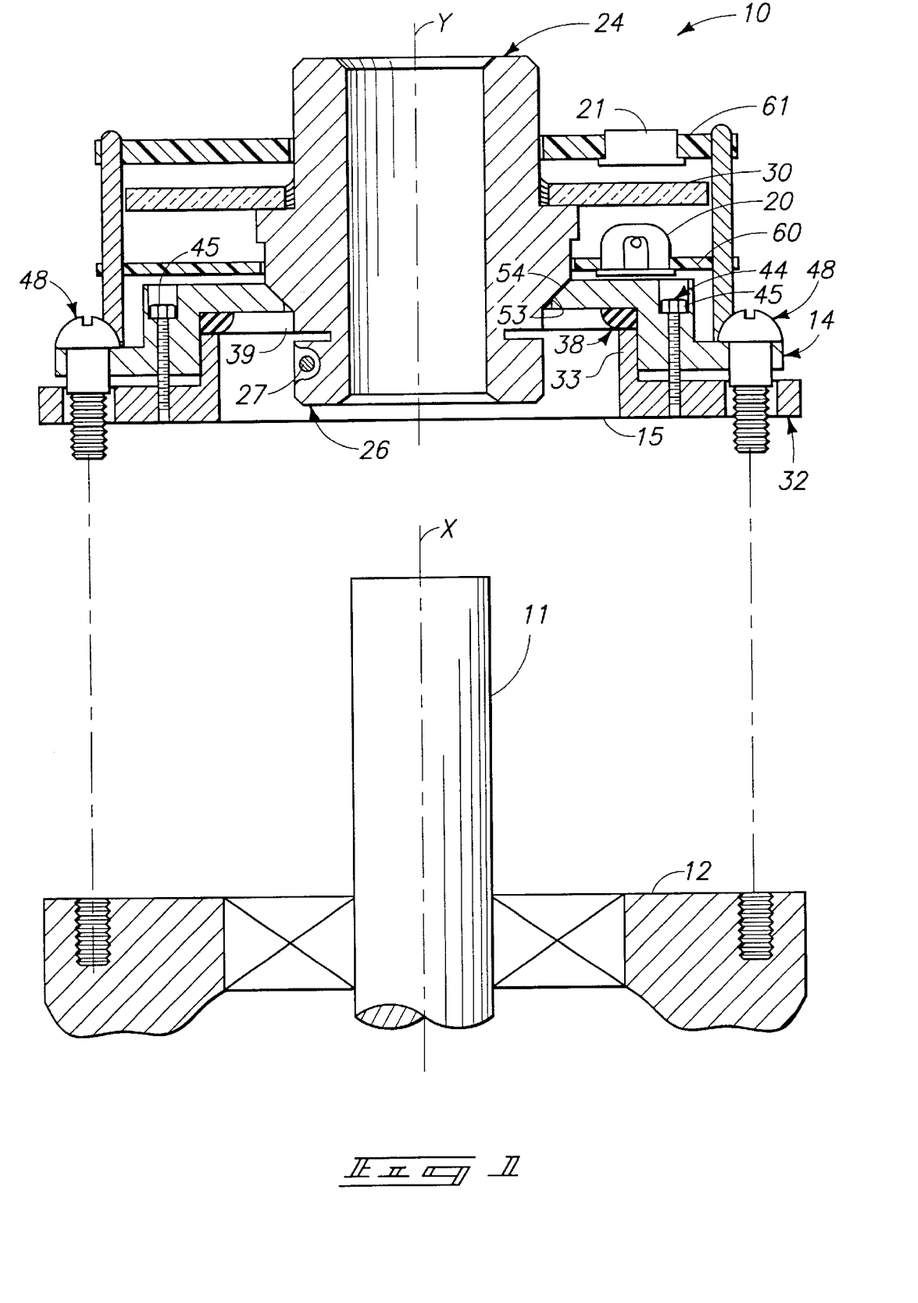
FIG. 1 is a sectional diagrammatic view of a modular encoder in position adjacent to first and second members that are rotatable relative to one another about a rotational axis.
Figure 2:
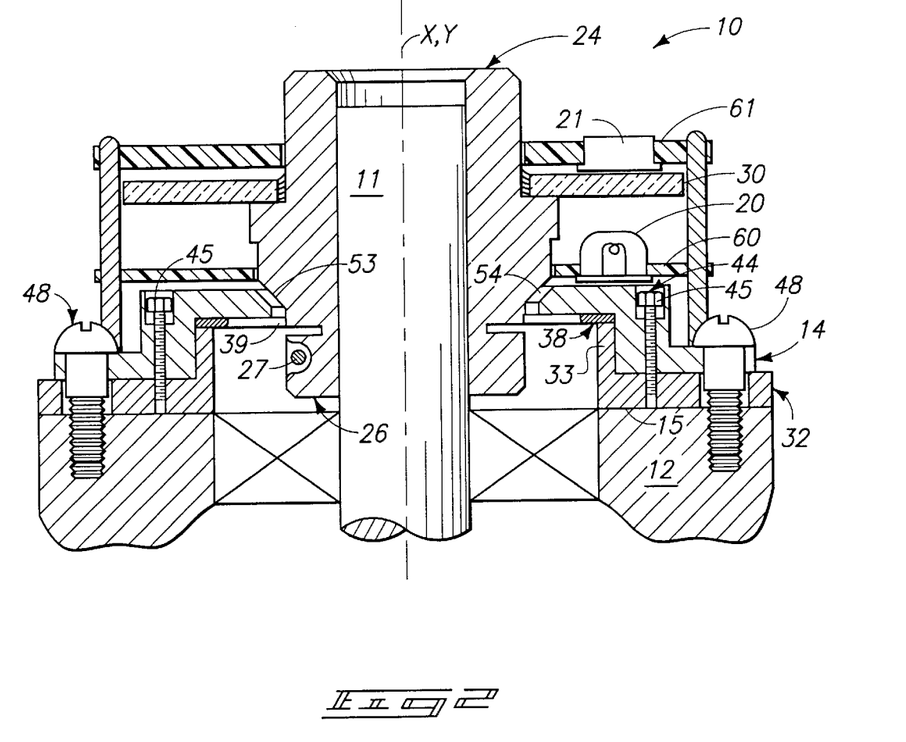
FIG. 2 is a sectional diagrammatic view of a modular encoder in a secured position with respect to the two members.
Figure 3:
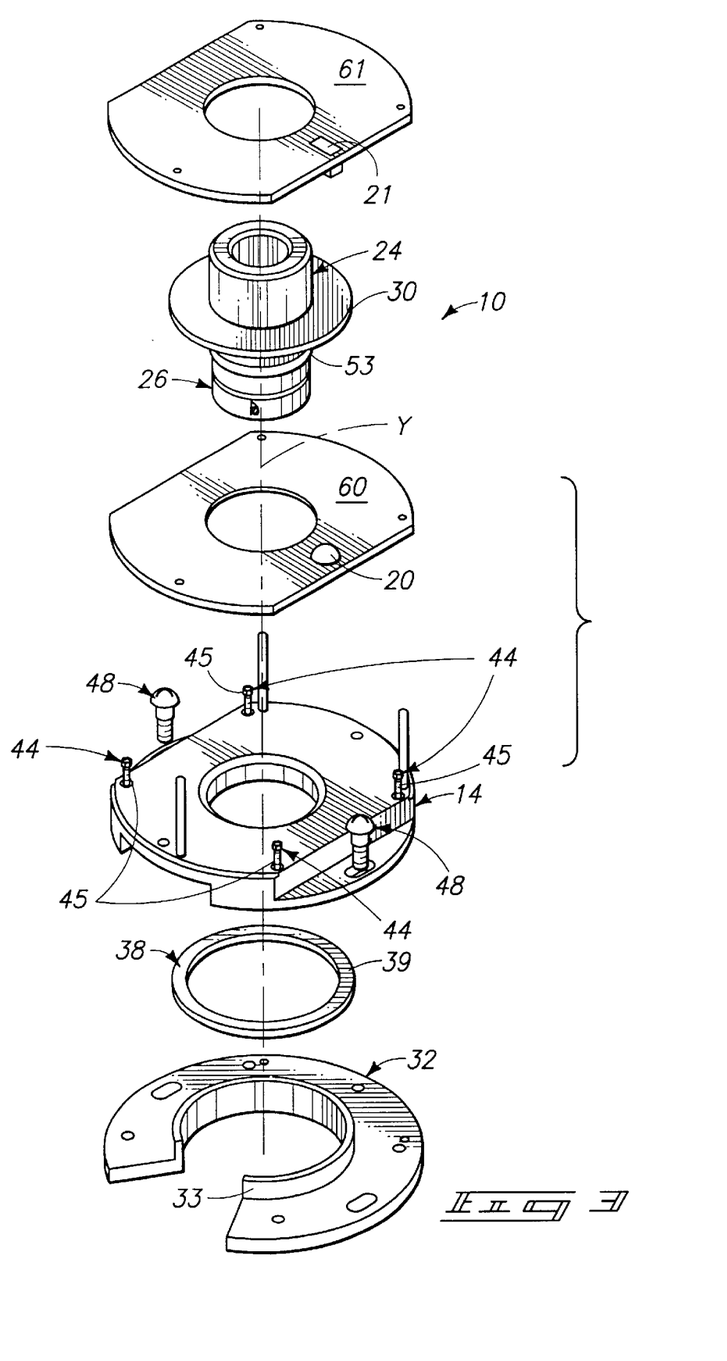
FIG. 3 is a perspective exploded schematic view of the encoder embodiment shown in FIGS. 1 and 2.

Separation of the base 14 and alignment bracket 32 is encouraged by the yieldable member 38 which, in the versions shown in FIGS. 1–3, may be provided in the form of a resilient annular member 39 such as resilient O-ring, button, belville spring, wave washer or other equivalent structure. In the FIGS. 1–3 embodiment, the O-ring will normally hold the base 14 and alignment bracket apart through a prescribed distance as determined by the mechanical stop 44. Of known resilient member forms, the exemplified wave spring washer currently a preferred choice for the yieldable member 30.

The stop 44 in the FIG. 1–3 configuration, is provided in the form of a plurality of bolts 45 that are loosely and slidably received through axial holes in the base 14. The bolts 45 threadably engage the alignment bracket 32 below. The headed ends of the bolts 45 function as the mechanical stop. Selective adjustment of the bolts (by way of the threaded engagement with alignment bracket 32) will result in axial positioning of the base 14 and bracket 32 through a defined and precise distance of travel which determines the precise positioning between the disk 30 and the sensor 21 in the FIG. 1–3 embodiment.

Note that in operation, the disk 30 is set at an axially stationary position secured on the shaft 11. Thus, axial motion of the base 14 will result in similar axial positioning of the emitter 20 and sensor 21 with respect to the disk, since the emitter 20 and sensor 21 are both mounted to the base 14 for movement relative to the disk 30.

Thus, when the fasteners 48 are secured to the second member or motor body 12, the base 14 may be moved axially downward until it comes into flush abutment with the alignment bracket 32. The resulting distance of axial travel is the prescribed distance by which it is desired to move the sensor 21 with respect to the disk 30.

The above is accomplished in opposition to the yieldable member 38. The member 38 will also function to urge separation of the base and alignment bracket when the fasteners 48 are loosened, as when the encoder is to be removed from the shaft 11 and motor body 12. Thus, the emitter 20 and sensor 21 will be automatically returned to the, non-operational condition as the base moves back upwardly to engage the headed ends of the mechanical stops 44.

Installation of the encoder version illustrated in FIGS. 1–3 is a simple and uncomplicated procedure but which results in precise positioning of the encoder components for extremely accurate operation.

To install this arrangement, the user simply fits the encoder downwardly over the shaft 11 such that the fitting 24 receives and slides axially along the shaft 11. This may be typically accomplished by using a fingertip, thumb or other device, pressed against the top end of the fitting. By this action, the encoder is initially fitted in relation to the shaft 11 and the axes X, Y become substantially coaxial to engage and press the upper end of the fitting downwardly.

Once the bottom surface of the alignment bracket 32 comes into contact with the second member 12 (the motor housing), the clamp screw 27 may be operated to secure the fitting to the shaft 11. Once the fitting is secure, downward pressure may be released. The fitting 24 and disk 30 are now accurately positioned axially and radially with respect to the shaft 11 and motor base 12. The centering surfaces 53, 54 also function at this time to radially and concentrically position the base and alignment bracket precisely in coaxial, concentric relation with the shaft and coaxial encoder axes X, Y.

To complete attachment of the FIG. 1–3 version of the encoder 10, the fasteners 48 are used to engage the motor base 12 and press the base 14 downward through the prescribed axial distance against opposition of the yieldable member 38. The distance of travel may have been previously determined by selectively adjusting the stops 44. Thus, with the axial travel of the base 14 with respect to the alignment bracket 32 being pre-determined, simple tightening of the fasteners 48 will result in axial motion of the base 14 and attached components through the precise axial distance. The result will be an extremely precise positioning of the sensor 21 with respect to the axially stationary disk 30.

From the above, it can be seen that the precise axial positioning of the sensor 21 and disk 30 is transparent to the user who need only take care that excessive force is not used when pressing the fitting onto the shaft. Precise positioning of the components is integrated with mounting of the encoder by use of the fasteners 48.

Reference will now be made to the embodiment illustrated in FIGS. 4–6. In this configuration, a somewhat different arrangement of the base 14 and alignment bracket 32 are provided. The emitter 20, sensor 21 and disk 30 are all pre-positioned in precise axial spacing, and such spacing is maintained during mounting and dismounting procedures. The alignment bracket in this arrangement includes a centering surface 55 that is coaxial with the centering surface 53 on the fitting 24.

The yieldable member 38 in this configuration is illustrated as a "belville" spring washer 40 that is fitted between the alignment bracket 32 and base 14, biasing the two members toward one another. It should be noted, however, that the belville washer 40 is exemplary and any of the other appropriate springs, including the examples illustrated for other embodiments, could be used as well. The mechanical stop 44 in this configuration is comprised of mating surfaces 46 between the base 14 and alignment bracket 32.

The FIG. 4–6 embodiment also includes an altered base 14 that provides the support engagement surface 15 which, along with the fasteners 48, serve to initially anchor the encoder 10 to the support 12.

The fasteners 48, in this version, include shoulders 49 that abut against complimentary surfaces on the alignment bracket 32 to press the alignment bracket 32 downwardly against resistance from the yieldable member 38, to thereby axially separate the base 14 and alignment bracket 32. As this happens, the alignment bracket 32 also separates axially from the fitting 24. The disk 30 and encoder components 20, 21 (being previously set in a precise spacial relationship) are maintained in this preset orientation during the procedures for mounting the encoder to the members 11 and 12.

Installation of the embodiment shown in FIGS. 4–6 involves a procedure similar to that previously described for the FIG. 1–3 embodiment. The user simply places the encoder 10 in position such that the shaft 11 is axially received by the fitting 24. User presses the fitting downwardly until the support engagement surface 15 of the base 14 engages the support 12. Once this occurs, the clamp may be tightened to axially secure the fitting in position on the shaft and the axial force may be relaxed.

Now the fasteners 48 may be used to complete the installation. By turning the threaded fasteners into mating threaded holes in the support, the fastener shoulders 49 will come into abutment with and press downwardly against the alignment bracket. The alignment bracket 32 will move downwardly against resistance offered by the yieldable member 38, thereby separating the centering surfaces 53, 55, which previously co-acted to precisely position the base 14 and alignment bracket 32 in concentricity with respect to the received shaft. 11. It is noted again that precise positioning of the disk with respect to the sensor 21 need not be of concern to the installer, since the axial spacing will have been previously set during assembly of the encoder. Installation serves to center the encoder and to axially separate the base 14 and alignment bracket 32 to free the fitting 24 and disk 30 to rotate freely with the shaft 11.

Loosening of the fasteners will permit the yieldable member 38 to axially move the alignment bracket 32 and base 14 together once again, and bring the centering surfaces together. The removal process may be completed by loosening the clamp screw 27 and axially sliding the entire encoder assembly away from the shaft 11. The encoder 10 is automatically re-positioned in the inoperative condition illustrated in FIG. 4 by operation of the axially yieldable member 38.

Reference is now made with respect to FIGS. 7 and 8. This embodiment is somewhat similar to the embodiment shown in FIGS. 1–3 with the exception that no alignment bracket is utilized and the base 14 is modified. Here, the base 14 is provided with the yieldable member 38 which is positionable between the base 14 and the support 12.

The base 14, in this configuration, is provided with the support engagement surface 15 and the yieldable member 38 will project below this surface by a distance equivalent to the desired movement of the sensor toward the disk. This may be a precise distance as determined by the nature and spacing of the yieldable member 38 in relation to the support engagement surface 15.

As with other embodiments of the encoder, any of several forms of axially yieldable members, several examples of which are discussed herein. In FIGS. 7 and 8, the axially yieldable member is an O-ring. Preferred forms of member 38 may also include spring loaded plungers 41 provided as the yieldable member 38 as exemplified in FIG. 9. Such plunger arrangements 41 may be precisely oriented with respect to the support engagement surface 15 and may further be pre-loaded such that their entrapped compression springs can be initially set against the base 14 to deflect only at a prescribed downward force. An exemplary detail of the spring plunger arrangement is shown by the fragmented detail in FIG. 9.

Figure 10:
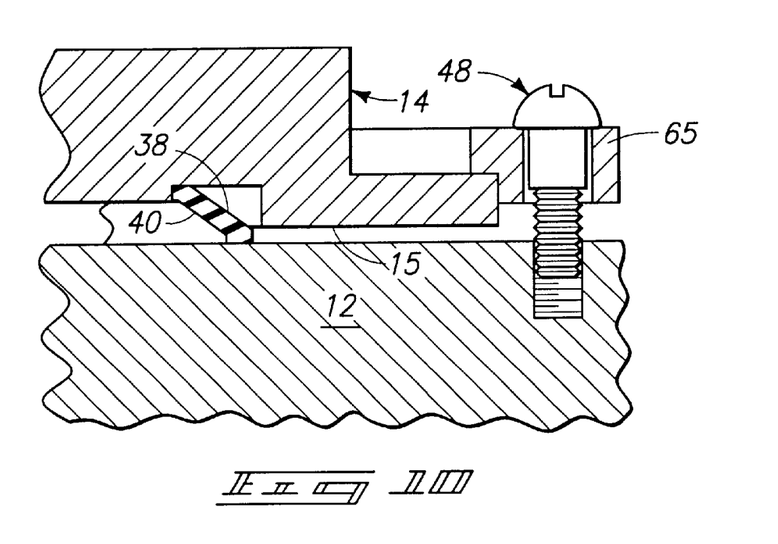
FIG. 10 is another fragmentary view of an exemplary axially yieldable member, and an alternate form of fastener for securing the encoder to a support such as a motor housing or body.

FIG. 10 illustrates another alternate form of the yieldable member 38 which may include a belville or wave spring washer arrangement that may be positioned between the base and support 12. This arrangement is illustrated simply to identify alternatives for the yieldable member 38.

Figure 9:
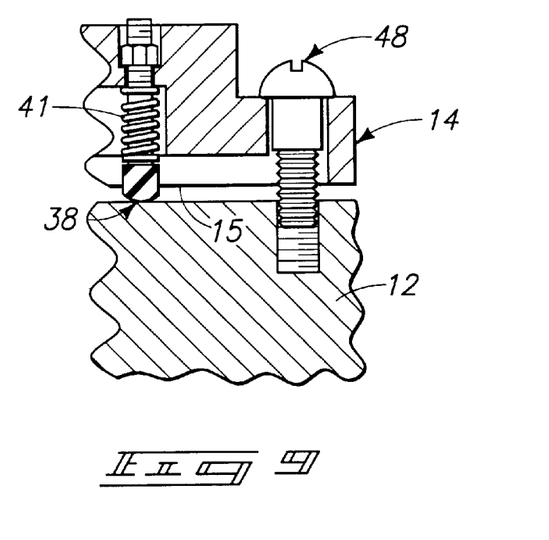
FIG. 9 is an enlarged fragmentary view of exemplary yieldable members.

It should also be noted that any of the illustrated spring arrangements may be used interchangeably. That is to say, a compression spring plunger arrangement as shown in FIG. 9 could be used in place of the resilient O-ring spring arrangement shown in the FIG. 1–3 embodiment. Similarly, the O-ring arrangement could be used in either the FIG. 3–5 embodiment, or the FIG. 7 and 8 configuration. It is possible other forms of yieldable members could also be utilized.

In another example, (not illustrated) an equivalent to the illustrated yieldable members could be integral with, molded into or affixed to the base or alignment bracket. Such a yieldable member could be formed within either or both of the members (base or alignment bracket) as an integral part thereof, possibly in the form of a leaf or bar spring.

Installation of the FIG. 9 embodiment may take place using procedures similar to those described above for the FIGS. 1–3 and 4–6 embodiments. The user places the encoder 10 over the shaft 11 such that the fitting axially and slidably receives the shaft 11. Continued pressure is maintained to slide the fitting 24 downwardly onto the shaft 11 to an axial position determined by the point of contact between the yieldable members 38 and the support surface 12. Once such contact is made, the user may tighten the clamp 26 to secure the fitting 24 and disk 30 in axial position on the shaft 11. The engaged centering surfaces 53, 54 function to position and maintain the base 14 and fitting 24 in concentric relation to the now coaxial axis X and Y. Once the fitting clamp 26 is secure, no further axial movement of the fitting 24 will occur and the base 14 may be clamped downwardly against the support by action of the fasteners 48. The fasteners will pull the base downwardly, thereby separating the centering surfaces, and shifting the sensor 21 into precise axial positioning with respect to the disk.

It is pointed out at this time that various forms of the fastener 48 may also be provided. The screw configuration shown in FIGS. 1–6 may be preferred, or an indirect form of fastener may also be used, as shown in FIG. 10. Here a "servo clip" clamping device 65 is shown as another preferred form of fastener 48.

Once again, the above installation process is transparent with respect to the precise positioning since the user needs only to initially press the encoder onto the shaft and subsequently secure the fasteners.

It is pointed out that there is no need in any of the embodiments exemplified herein, for use of a shim or other device for determining and setting precise axial positioning between the disk and sensor. This spacing is pre-determined during assembly of the encoder and the objective of mounting the device, by performing the above steps, assures a properly centered and spaced relationship of the encoder elements.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An encoder for detecting angular movement between first and second relatively rotatable members about a rotational axis, comprising:
    a base;
    an emitter mounted to the base and operable to generate a signal;
    a sensor mounted to the base in spaced relation to the emitter;
    a fitting defining an encoder axis and configured to be secured to the first member with the encoder axis at least substantially coaxial with the rotational axis of the first member;
    a signal interrupting disk mounted to the fitting and positioned in axially spaced relation to the emitter and sensor;
    an alignment bracket mounted to the base for axial movement along the encoder axis;
    an axially yieldable member disposed between the base and alignment bracket, normally biasing the base and alignment bracket axially through a prescribed distance toward engagement with a mechanical stop, yieldably positioning the base and alignment bracket in an inoperative pre-mounting relationship; and
    at least one fastener, engaging at least one of the base and alignment bracket with the second member and operable (a) in a first mode to deflect the yieldable member axially and to position the base and alignment bracket in an operative position with the emitter and sensor in a prescribed axial relation to the disk, and (b) in a second mode in which the yieldable member is free to return the base and alignment bracket to the inoperative pre-mounting relationship.

2. The encoder of claim 1 further comprising at least one centering surface on the fitting and positioned to engage at least one of the base and alignment bracket, to radially position the base and alignment bracket with respect to the encoder axis.

3. The encoder of claim 1, further comprising centering surfaces comprised of mating conical surfaces formed on the fitting and the base.

4. The encoder of claim 1, further comprising centering surfaces which include mating conical surfaces formed on the fitting and the alignment bracket, engaged in the inoperative pre-mounting relationship and releasably holding the fitting and alignment bracket in concentric relation to the encoder axis.

5. The encoder of claim 1 wherein the axially yieldable member is a spring.

6. The encoder of claim 1 wherein the axially yieldable member is a compression spring mounted between the base and alignment bracket.

7. The encoder of claim 1 wherein the axially yieldable member is a wave washer form of spring.

8. The encoder of claim 1 wherein said at least one fastener is comprised of a screw configured to threadably engage the second member and having a headed end positioned to engage and axially move the base toward the alignment bracket.

9. The encoder of claim 1 wherein said at least one fastener is comprised of a screw configured to threadably engage the second member and having a shoulder positioned to engage and axially move the alignment bracket toward the second member.

10. The encoder of claim 1 wherein said at least one fastener is comprised of a clamping device mounted to secure one of the base and alignment bracket to the second member.

11. The encoder of claim 1 wherein the emitter is a light emitting device and the sensor is a light detection device.

12. The encoder of claim 1 wherein the base is comprised of a plate having an opening formed therein shaped to axially receive the first member and the fitting and wherein the alignment bracket includes an opening receiving the fitting and a boss slidably received within the opening in the plate to guide relative concentric axial movement of the alignment bracket with respect to the base.

13. The encoder of claim 1 wherein the base is comprised of a plate having an opening formed therein and shaped to axially receive the first member and the fitting and wherein the alignment bracket includes an opening and a boss slidably received for relative axial movement by the base; and wherein the axially yieldable member is disposed between the boss and the base.

14. An encoder module for detecting rotational movement of a shaft about an axis with respect to a shaft support, the encoder module comprising:
    an emitter and a sensor mounted to a base;
    a fitting configured to be mounted in a fixed axial position on the shaft for rotation therewith;
    a signal interrupting disk mounted to the fitting and disposed in axial spaced relation to the emitter and sensor;
    an alignment bracket mounted to the base for axial movement relative thereto;

a yieldable member between the alignment bracket and base, normally biasing the base axially with respect to the alignment bracket through a prescribed distance toward a stop and an inoperative pre-mounting relationship; and a fastener operably coupled with the alignment bracket and base, configured to be secured to the shaft support, and operable to move the base and alignment bracket relative to one another and in opposition to the yieldable member, to axially separate at least one of the bracket and base from the fitting by at least a part of said prescribed distance.

15. The encoder module of claim 14 wherein the base includes a flange with a support engaging surface spaced axially adjacent to the alignment bracket.

16. The encoder module of claim 14 wherein the fitting and base include axially aligned complimentary conical centering surfaces.

17. The encoder module of claim 14 wherein the base includes a flange with a support engaging surface spaced axially adjacent to the alignment bracket; and wherein at least one of the fitting and the base includes an axially oriented conical centering surface.

18. An encoder module for detecting rotational motion of a shaft about a rotation axis relative to a support, comprising:

a base having a support engagement surface;

an emitter and a sensor mounted in fixed relation on the base;

a fitting configured to be mounted in fixed axial position to the shaft for rotation therewith;

a signal interrupting disk mounted to the fitting and disposed axially with respect to the emitter and sensor;

an alignment bracket mounted to the base for axial movement thereon;

a spring between the alignment bracket and base, normally biasing the base and alignment bracket toward one another;

centering surfaces on the fitting and alignment bracket, radially positioning the signal interrupting disk with respect to emitter and sensor; and at least one fastener, configured to be secured to the shaft support, to hold the support engagement surface against the support and selectively move the alignment bracket axially away from the fitting to axially separate the bracket and fitting.

19. An encoder module for detecting rotational motion of a shaft about a rotation axis relative to a support, comprising:

a base having a support engagement surface;

an emitter and a sensor mounted in fixed relation on the base;

a fitting configured to be mounted in fixed axial position to the shaft for rotation therewith;

a signal interrupting disk mounted to the fitting and disposed axially with respect to the emitter and sensor;

a centering surface on at least one of the fitting and base, centering the base on the fitting;

a yieldable member on the base positioned thereon to engage and deflect against the support through a prescribed axial distance; and at least one fastener engaged with the base and, configured to be secured to the shaft support, to selectively engage the support and move the base axially against resistance from the yieldable member through at least a portion of said prescribed distance and thereby (a) disengage the centering surfaces, (b) move the emitter and sensor into a selected axial relation to the disk, and (c) bring the support engagement surface into contact with the support.

20. The encoder module of claim 19 wherein the yieldable member is comprised of at least one compression spring mounted to the base and projecting axially therefrom to engage and compress against the support.

21. The encoder module of claim 19 wherein the yieldable member is comprised of at least one pre-loaded compression spring mounted to the base and projecting axially therefrom to engage and compress against the support.

22. The encoder module of claim 19 wherein the yieldable member projects axially beyond the support engagement surface by a distance at least approximately equal to said prescribed distance.

23. The encoder module of claim 19 wherein the yieldable member is a wave washer type spring.

24. The encoder module of claim 19 wherein the yieldable member is a resilient "O" ring.

25. The encoder module of claim 19 wherein the yieldable member is a belville washer type spring.

* * * * *

UNITED STATES PATENT AND TRADEMARK OFFICE
CERTIFICATE OF CORRECTION

PATENT NO.   : 6,608,300 B2  
DATED        : August 19, 2003  
INVENTOR(S)  : John T. Meschko It is certified that error appears in the above-identified patent and that said Letters Patent is hereby corrected as shown below:

<u>Title page,</u>
Item [54], Title, please insert -- FOR -- after "ENCODER".

<u>Column 7,</u>
Line 64, please delete "shaft." after "received" and insert -- shaft --.

Signed and Sealed this

Twenty-fourth Day of February, 2004

JON W. DUDAS
*Acting Director of the United States Patent and Trademark Office*